US012574255B2

(12) United States Patent
Kang

(10) Patent No.: US 12,574,255 B2
(45) Date of Patent: Mar. 10, 2026

(54) SECURE PROGRAMMING SYSTEM, OPERATING METHOD THEREOF AND COMPUTER READABLE RECORDING MEDIUM USING SUCH OPERATING METHOD

(71) Applicant: Dediprog Technology Co., Ltd., Taipei City (TW)

(72) Inventor: Ming-Hui Kang, Taipei City (TW)

(73) Assignee: DEDIPROG TECHNOLOGY CO., LTD., Taipei City (TW)

( * ) Notice: Subject to any disclaimer, the term of this patent is extended or adjusted under 35 U.S.C. 154(b) by 159 days.

(21) Appl. No.: 18/397,674

(22) Filed: Dec. 27, 2023

(65) Prior Publication Data

US 2025/0023722 A1    Jan. 16, 2025

Related U.S. Application Data

(60) Provisional application No. 63/525,809, filed on Jul. 10, 2023, provisional application No. 63/525,825, filed on Jul. 10, 2023.

(30) Foreign Application Priority Data

Oct. 31, 2023    (TW) ................................. 112141864
Oct. 31, 2023    (TW) ................................. 112141865

(51) Int. Cl.
*H04L 9/08*          (2006.01)
*H04L 9/30*          (2006.01)
*H04L 9/32*          (2006.01)

(52) U.S. Cl.
CPC ............ *H04L 9/3263* (2013.01); *H04L 9/088* (2013.01); *H04L 9/30* (2013.01); *H04L 9/3226* (2013.01); *H04L 9/3247* (2013.01)

(58) Field of Classification Search
CPC ......... H04L 9/30; H04L 9/3226; H04L 9/088; H04L 9/3247; H04L 9/3263
See application file for complete search history.

(56) References Cited

U.S. PATENT DOCUMENTS 5,857,022 A       1/1999  Sudia
9,781,086 B2 *  10/2017  Jelatis ................... H04L 9/3247
(Continued)

FOREIGN PATENT DOCUMENTS

CN         107979467 A      5/2018
CN         108647499 A     10/2018
(Continued)

OTHER PUBLICATIONS

U.S. Notice of Allowance for U.S. Appl. No. 18/397,606, dated Oct. 17, 2025.

(Continued)

*Primary Examiner* — Mohammad A Siddiqi
(74) *Attorney, Agent, or Firm* — Birch, Stewart, Kolasch & Birch, LLP

(57)        ABSTRACT

A method for operating a secure programming system is provided. Firstly, a first verification code is calculated according to a payload extracted from a job control package. Then, a second verification code is calculated according to the payload burnt into a programmable device. If the first verification code and the second verification code are verified successfully, a burning task is performed. Then, an OEM certificate signing request is generated according to an identifiable information and a programmable device public key. If the OEM certificate signing request is verified successfully, an OEM device certificate is generated and signed with an OEM private key. A third verification code is calculated according to the OEM device certificate. Then, a (Continued)

fourth verification code is calculated according to the OEM device certificate burnt into the programmable device.

24 Claims, 3 Drawing Sheets

(56) References Cited

U.S. PATENT DOCUMENTS

| | | | |
|---|---|---|---|
| 9,900,310 B2 * | 2/2018 | Brickell | H04L 63/0876 |
| 10,069,633 B2 | 9/2018 | Gulati et al. | |
| 10,110,411 B2 | 10/2018 | Gulati | |
| 10,263,790 B2 * | 4/2019 | Gulati | G06F 21/572 |
| 11,336,440 B2 | 5/2022 | Shpurov et al. | |
| 11,895,250 B2 * | 2/2024 | Simplicio | H04L 9/0894 |
| 12,132,841 B2 | 10/2024 | Smith, III et al. | |
| 12,160,516 B2 | 12/2024 | Ngo et al. | |
| 2004/0117612 A1 | 6/2004 | Falk | |
| 2005/0076216 A1 * | 4/2005 | Nyberg | H04L 63/061 |
| | | | 713/168 |
| 2013/0073856 A1 * | 3/2013 | Sherkin | H04L 63/0428 |
| | | | 713/176 |
| 2014/0164779 A1 * | 6/2014 | Hartley | H04L 9/0866 |
| | | | 713/176 |
| 2016/0092701 A1 | 3/2016 | Shah et al. | |
| 2018/0219857 A1 * | 8/2018 | Bhattacharya | H04L 63/0807 |
| 2019/0052464 A1 * | 2/2019 | Doliwa | H04L 63/0807 |
| 2019/0163909 A1 * | 5/2019 | Schilder | G06F 21/79 |
| 2019/0188387 A1 * | 6/2019 | Fu | H04L 9/0894 |
| 2019/0273616 A1 | 9/2019 | Bres | |
| 2019/0289006 A1 * | 9/2019 | Fang | H04W 4/70 |
| 2022/0014389 A1 * | 1/2022 | Nix | H04L 9/0838 |
| 2023/0009032 A1 * | 1/2023 | Khatri | G06Q 30/0645 |
| 2023/0010345 A1 * | 1/2023 | Khatri | G09C 1/00 |
| 2023/0185482 A1 | 6/2023 | Steinmetz et al. | |

FOREIGN PATENT DOCUMENTS

| | | |
|---|---|---|
| CN | 111342955 A | 6/2020 |
| CN | 111611593 A | 9/2020 |
| CN | 114912138 A | 8/2022 |
| CN | 116070215 A | 5/2023 |
| CN | 116257820 A | 6/2023 |
| TW | 201401102 A | 1/2014 |
| TW | 201820132 A | 6/2018 |
| TW | 202207664 A | 2/2022 |
| TW | I773161 B | 8/2022 |
| TW | V202232912 A | 8/2022 |
| WO | WO 2020/052335 A1 | 3/2020 |

OTHER PUBLICATIONS

U.S. Office Action for U.S. Appl. No. 18/767,037, dated Oct. 1, 2025.

U.S. Office Action for U.S. Appl. No. 18/767,037, dated Jan. 20, 2026.

* cited by examiner

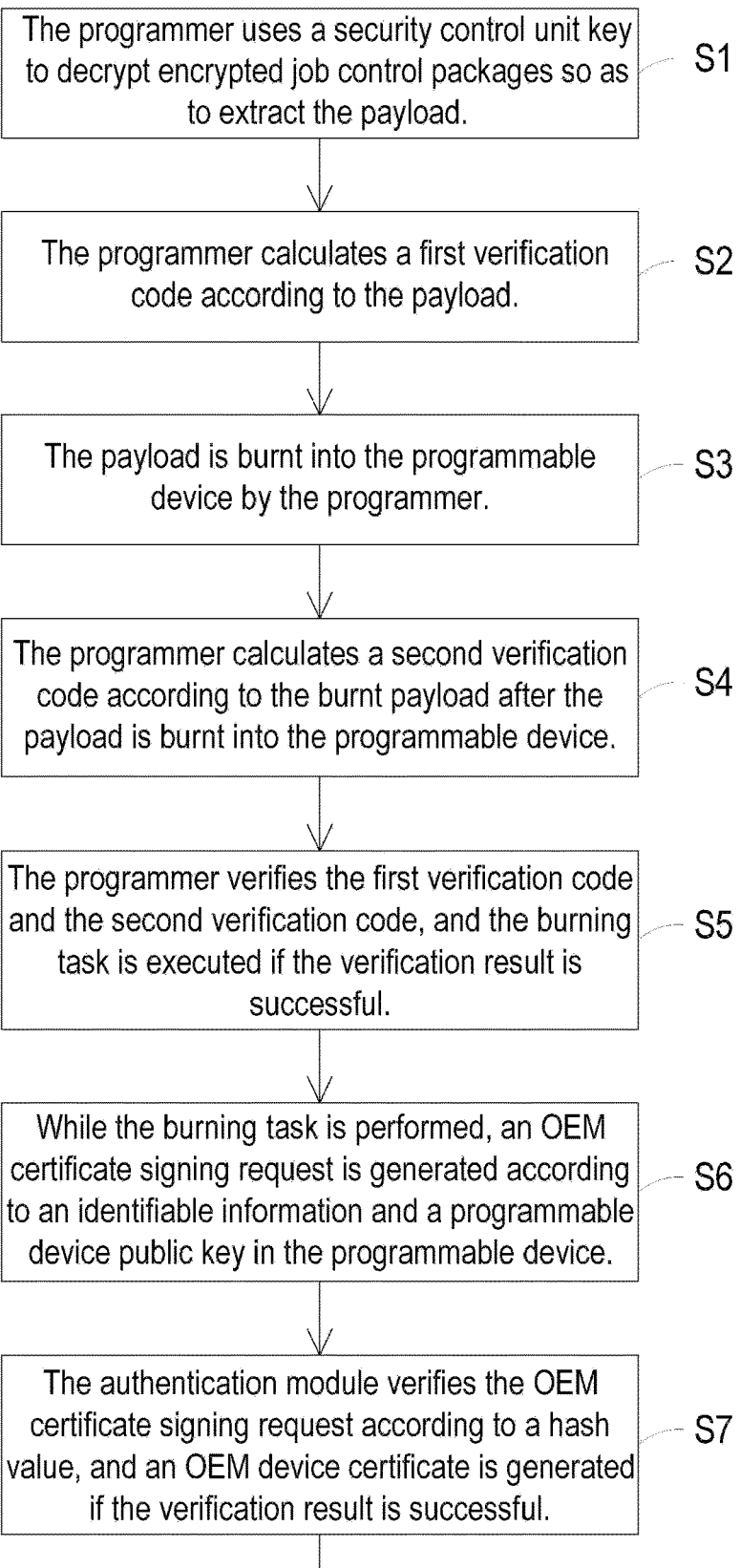

The programmer uses a security control unit key to decrypt encrypted job control packages so as to extract the payload.        S1

The programmer calculates a first verification code according to the payload.        S2

The payload is burnt into the programmable device by the programmer.        S3

The programmer calculates a second verification code according to the burnt payload after the payload is burnt into the programmable device.        S4

The programmer verifies the first verification code and the second verification code, and the burning task is executed if the verification result is successful.        S5

While the burning task is performed, an OEM certificate signing request is generated according to an identifiable information and a programmable device public key in the programmable device.        S6

The authentication module verifies the OEM certificate signing request according to a hash value, and an OEM device certificate is generated if the verification result is successful.        S7

SECURE PROGRAMMING SYSTEM, OPERATING METHOD THEREOF AND COMPUTER READABLE RECORDING MEDIUM USING SUCH OPERATING METHOD

CROSS-REFERENCE TO RELATED APPLICATION

This application claims the benefit of U.S. Provisional Application Ser. No. 63/525,825 filed on Jul. 10, 2023, and claims the benefit of U.S. Provisional Application Ser. No. 63/525,809 filed on Jul. 10, 2023. This application claims priority to Taiwan Patent Application No. 112141865 filed on Oct. 31, 2023, and claims priority to Taiwan Patent Application No. 112141864 filed on Oct. 31, 2023. The entire contents of the above-mentioned patent applications are incorporated herein by reference for all purposes.

FIELD OF THE INVENTION

The present invention relates to the technology of a secure programming system, and more particularly to a secure programming system, an operating method of the secure programming system, and a computer readable recording medium using the operating method.

BACKGROUND OF THE INVENTION

In the existing burning operations and processes, the data to be burnt are plain texts without encryption protection. After the data are burnt into an integrated circuit, the integrated circuit also lacks any encryption protection mechanism or identity authentication mechanism. That is, the integrated circuit can be operated or controlled through unauthorized devices. Furthermore, uncertified personnel are allowed to analyze, tamper, leak or plagiarize the burnt data in the integrated circuit.

Therefore, it is important to provide a secure programming system, an operating method of the secure programming system, and a computer readable recording medium using the operating method.

SUMMARY OF THE INVENTION

The present invention provides a secure programming system, an operating method of the secure programming system, and a computer readable recording medium using the operating method. While the burning task is performed, the burnt data are only permitted to be read by the device that possesses the corresponding paired public or private keys and passes the real-time identity verification. Consequently, the burnt data will not be tampered, damaged, leaked and plagiarized. By using the secure programming system, the operating method of the secure programming system and the computer readable recording medium of the present invention, only the authenticated devices are allowed to operate/control firmware programs in the securely programmed integrated circuits.

In accordance with an aspect of the present invention, a method for operating a secure programming system is provided. The secure programming system includes a programmer, a programming unit, an authentication module and a hardware security module. The method includes the following steps. In a step (S1), the programmer uses a security control unit key to decrypt an encrypted job control package so as to extract a payload. In a step (S2), the programmer calculates a first verification code according to the payload. In a step (S3), the programmer burns the payload into a programmable device. In a step (S4), the burnt payload is read from the programmable device, and a second verification code is calculated according to the burnt payload. In a step (S5), the programmer verifying the first verification code and the second verification code, wherein when the first verification code and the second verification code are verified successfully, a burning task is performed. In a step (S6), while the burning task is performed, the programming unit generates an OEM certificate signing request according to an identifiable information and a programmable device public key in the programmable device. In a step (S7) the authentication module verifies the OEM certificate signing request according to a hash value. When the OEM certificate signing request is verified successfully, an OEM device certificate is generated. In a step (S8), the hardware security module signs the OEM device certificate with an OEM private key. In a step (S9), the programming unit verifies the OEM device certificate with an OEM public key. In a step (S10), when a verification result of the step S9 is correct, the programmer calculates a third verification code according to the OEM device certificate. In a step (S11), the programmer burns the OEM device certificate into the programmable device. In a step (S12), the programmer reads the burnt OEM device certificate from the programmable device and calculates a fourth verification code according to the burnt OEM device certificate. In a step (S13), the programmer verifies the third verification code and the fourth verification code. In a step (S14), the programming unit categorizes the programmable device according to a verification result of the step S13, wherein when the verification result is successful, the programmable device is categorized into a first output container representing a good output container.

In accordance with another aspect of the present invention, a computer-readable recording medium is used in a secure programming system to store at least one software instruction sequence. The at least one software instruction sequence is executed by at least one processor. The secure programming system includes a programmer, a programming unit, an authentication module and a hardware security module. The at least one software instruction sequence is executed to perform a method. The method includes the following steps. In a step (S1), the programmer uses a security control unit key to decrypt an encrypted job control package so as to extract a payload. In a step (S2), the programmer calculates a first verification code according to the payload. In a step (S3), the programmer burns the payload into a programmable device. In a step (S4), the burnt payload is read from the programmable device, and a second verification code is calculated according to the burnt payload. In a step (S5), the programmer verifying the first verification code and the second verification code, wherein when the first verification code and the second verification code are verified successfully, a burning task is performed. In a step (S6), while the burning task is performed, the programming unit generates an OEM certificate signing request according to an identifiable information and a programmable device public key in the programmable device. In a step (S7) the authentication module verifies the OEM certificate signing request according to a hash value. When the OEM certificate signing request is verified successfully, an OEM device certificate is generated. In a step (S8), the hardware security module signs the OEM device certificate with an OEM private key. In a step (S9), the programming unit verifies the OEM device certificate with an OEM public key. In a step (S10), when a verification result of the step S9 is correct, the programmer calculates a third verification code according to the OEM device certificate. In a step (S11), the programmer burns the OEM device certificate into the programmable device. In a step (S12), the programmer reads the burnt OEM device certificate from the programmable device and calculates a fourth verification code according to the burnt OEM device certificate. In a step (S13), the programmer verifies the third verification code and the fourth verification code. In a step (S14), the programming unit categorizes the programmable device according to a verification result of the step S13, wherein when the verification result is successful, the programmable device is categorized into a first output container representing a good output container.

In accordance with a further aspect of the present invention, a secure programming system is provided. The secure programming system includes a programmer, an authentication module and a programming unit. The programmer uses a security control unit key to decrypt an encrypted job control package to extract a payload, calculates a first verification code according to the payload, and burns the payload into a programmable device. After the payload is burnt into the programmable device, the programmer reads the burnt payload from the programmable device, calculates a second verification code according to the burnt payload, and verifies the first verification code and the second verification code. When the first verification code and the second verification code are verified successfully, a burning task is performed. While the burning task is performed, the programmer reads an identifiable information and a programmable device public key from the programmable device and transmits the identifiable information and the programmable device public key to a programming unit. Consequently, the programming unit generates an OEM certificate signing request. The authentication module is connected with the hardware security module to verify an OEM certificate signing request according to a hash value. When the OEM certificate signing request is verified successfully, the authentication module generates an OEM device certificate to the hardware security module. The hardware security module is configured to sign the OEM device certificate and generate a signed OEM device certificate. The programming unit is connected with the programmer. The programming unit verifies the OEM device certificate with an OEM public key. When the OEM device certificate is verified successfully, the OEM device certificate is transmitted to the programmer. The programmer programs both of the OEM device certificate and the payload into the programmable device. When the OEM device certificate is successfully verified with the OEM public key by the programming unit, the programmer calculates a third verification code according to the OEM device certificate, and the programmer burns the OEM device certificate into the programmable device. After the programmer reads the burnt OEM device certificate and calculates a fourth verification code according to the burnt OEM device certificate, the programmer verifies the third verification code and the fourth verification code. The programming unit categorizes the programmable device according to a result of verifying the third verification code and the fourth verification code. When the third verification code and the fourth verification code are verified successfully, the programmable device is categorized into a first output container representing a good output container.

The above contents of the present invention will become more readily apparent to those ordinarily skilled in the art after reviewing the following detailed description and accompanying drawings, in which:

BRIEF DESCRIPTION OF THE DRAWINGS

FIGS. 1A and 1B illustrate a flowchart of a method for operating a secure programming system according to an embodiment of the present invention.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1B:
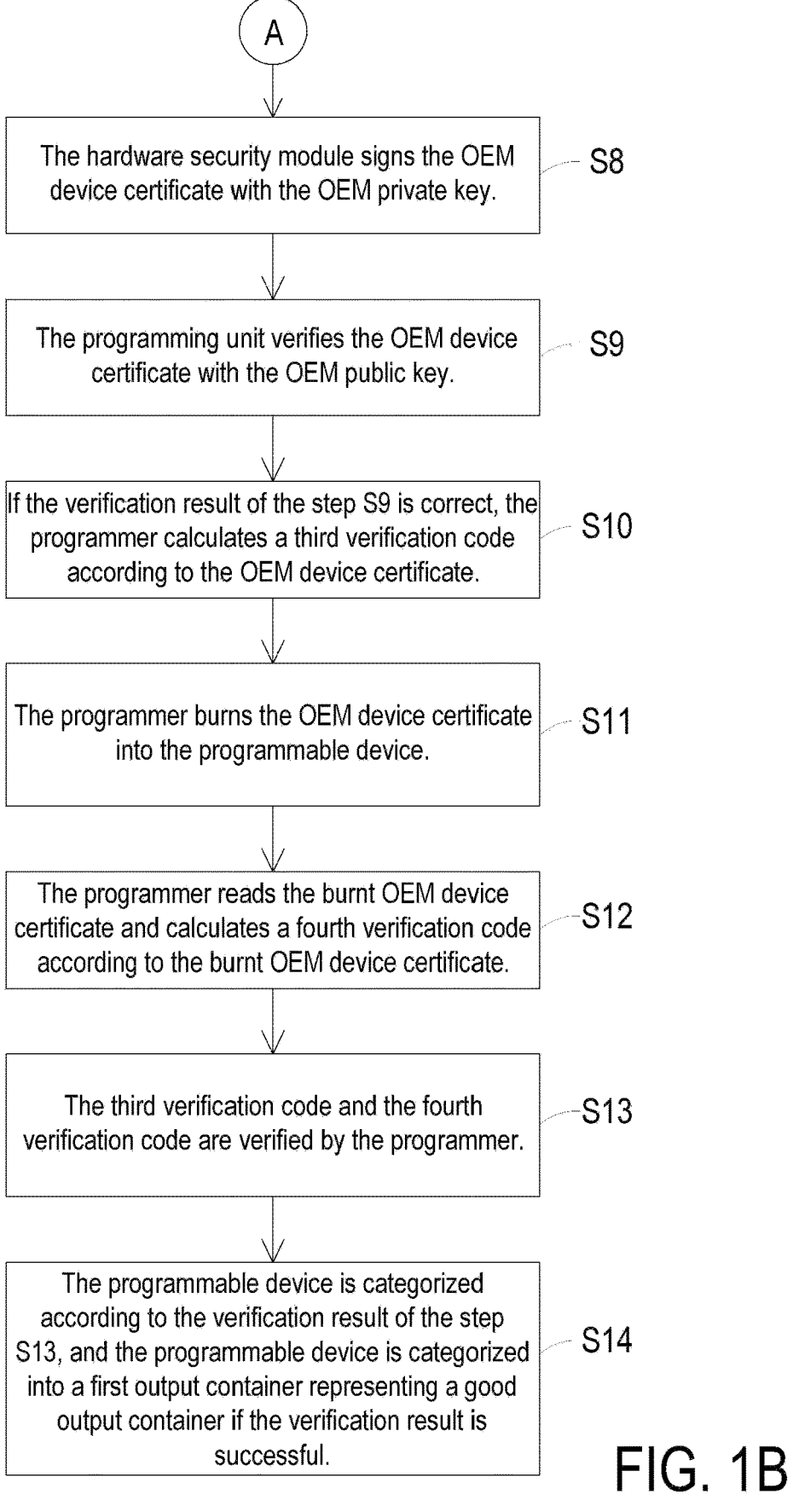
Figure 2:
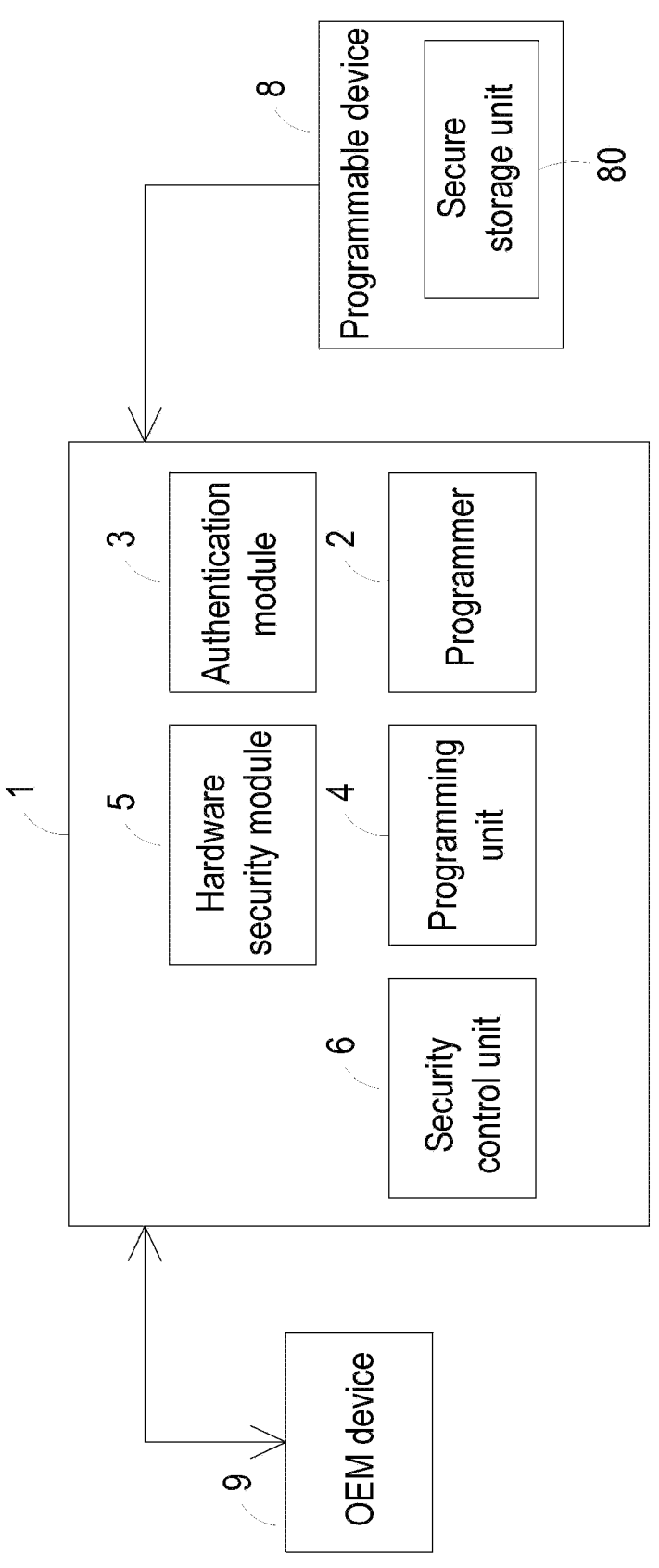
FIG. 2 schematically illustrates the architecture of the secure programming system using the method of FIGS. 1A and 1B.

Please refer to FIGS. 1A, 1B and 2. FIGS. 1A and 1B illustrate a flowchart of a method for operating a secure programming system according to an embodiment of the present invention. FIG. 2 schematically illustrates the architecture of the secure programming system using the method of FIGS. 1A and 1B. The present invention provides a method for operating the secure programming system 1. That is, the operating method is applied to the secure programming system 1.

The secure programming system 1 is in communication with an original equipment manufacturer (OEM) device 9.

The secure programming system 1 can individually encrypt a target payload of data and code and then program the information into at least one programmable device 8. For example, the programmable device includes an integrated circuit, a memory chip, a circuit board, or an electronic device (e.g., a smart phone, a media player, or any other appropriate consumer and industrial electronic device). The programmable device 8 includes a secure storage unit 80. The secure programming system 1 can create a customized payload package that can only be decrypted by a system or device having the correct security keys.

The secure programming system 1 includes at least one programmer 2, an authentication module 3, a programming unit 4, a hardware security module (HSM) 5 and a security control unit 6. The programmer 2 is an electromechanical system for physically programming the programmable device 8. The authentication module 3 can authenticate one or more attributes of the programmable device 8. The authentication module 3 is connected with the hardware security module 5. The security control unit 6 is a computing device for processing security information. The security control unit 6 includes specific cryptographic and computational hardware to facilitate the processing of cryptographic information. For example, the security control unit 6 includes a quantum computer, a parallel computing circuit system, a field-programmable gate array (FPGA) configured to process security information, a co-processor, an array logic unit, a microprocessor, or a combination thereof. Moreover, the security control unit 6 can be specifically configured as a security device to prevent unauthorized access to security information at the input, intermediate, or final stages of processing security information.

In an embodiment, the operating method includes the following steps.

In a step S1, the programmer 2 uses a security control unit key to decrypt encrypted job control packages so as to extract the payload. After the encrypted job control packages is decrypted with the security control unit key, the payload is extracted.

In an embodiment, the step S1 includes the following sub-steps.

Firstly, the security control unit 6 generates a hardware security module public key (HSM Pb.key) and a hardware security module private key (HSM Pr.key) to the hardware security module 5 by using the asymmetric encryption algorithm. The hardware security module public key and the hardware security module private key match each other. Furthermore, the security control unit 6 sets the production count that can be used with the corresponding hardware security module public key. The hardware security module public key can be outputted from the security control unit 6 to the original equipment manufacturer device 9. In addition, the hardware security module private key is stored within the hardware security module 5.

Then, the programming unit 4 retrieves one or more unique serial numbers from one or more programmers 2. The one or more unique serial numbers are integrated into an identification list. The identification list is transmitted to the original equipment manufacturer device 9.

Then, the original equipment manufacturer device 9 generates an OEM public key and an OEM private key by using the asymmetric encryption algorithm. The OEM public key and the OEM private key match each other. Then, the identification list about the at least one programmer 2 and the payload are placed into the job control package by the original equipment manufacturer device 9. Then, the job control package is encrypted according to the security control unit key that is generated randomly by the security control unit 6. In addition, the hardware security module public key is loaded to the security control unit 6, and the security control unit key and the OEM private key are encrypted according to the hardware security module public key respectively. Afterwards, the encrypted job control package, the encrypted security control unit key, the encrypted OEM private key, the OEM public key, an authentication list and the hardware security module public key are transmitted to the programming unit 4.

Then, the programming unit 4 reads a device identification code of programmable device 8 through the programmer 2. In addition, the programming unit 4 verifies the device identification code according to an authentication list.

Then, if the device identification code is verified successfully according to the authentication list, the programming unit 4 transmits the hardware security module public key to the hardware security module 5 and requests the hardware security module 5 to provide the corresponding usable production count. The usable production count is transmitted from the hardware security module 5 to the programming unit 4.

Then, according to the usable production count, the programming unit 4 determines whether a burning task is continuously performed. If the usable production count is 0, the burning task is stopped. Whereas, if the usable production count is not 0, the programming unit 4 deducts the usable production count by a pre-withheld production count. For example, the pre-withheld production count is at least one. However, if the pre-withheld production count exceeds the usable production count, the upper limit of the usable production count is served as the pre-withheld production count by the programming unit 4. Then, the pre-withheld production count is stored in the programming unit 4. Furthermore, the remaining usable production count after deducting the pre-withheld production count is transmitted from the programming unit 4 to the hardware security module 5 for storage. In other words, the programming unit 4 is configured to confirm the stored production count. If the burn count in the programmer 2 is less than the production count, the programmer 2 is driven to perform the burning task by the programming unit 4. Whereas, if the burn count in the programmer 2 exceeds the production count, the programmer 2 is still driven to perform the burning task. However, the burn count in the programmer 2 may at most reach the upper limit of the usable production count.

Then, the encrypted job control package is transmitted from the programming unit 4 to the programmer 2 and stored in a random-access memory (not shown) of the programmer 2. Then, the encrypted job control package in programming unit 4 is erased.

Then, the encrypted security control unit key, the encrypted OEM private key and the hardware security module public key are transmitted from the programming unit 4 to the hardware security module 5 for decryption. The decrypted OEM private key is stored in the hardware security module 5. After the programming unit 4 receives the decrypted security control unit key from hardware security module 5, the decrypted security control unit key is transmitted to the random-access memory of the programmer 2 to decrypt the encrypted job control package. Afterwards, the programmer 2 extracts the payload from the decrypted job control package and then extracts the identification list matching the serial number of the programmer 2. If the serial number is not included in the identification list, the burning task is stopped. If the serial number is included in the identification list, the burning task is performed continuously.

After the step S1, a step S2 is performed. In the step S2, the programmer 2 calculates a first verification code according to the payload. Especially, the first verification code is firstly calculated by the programmer 2 according to the payload of the decrypted job control package that is temporarily stored in random-access memory, and then the first verification code is temporarily stored in the random-access memory.

In a step S3, the payload is burnt into the programmable device 8 by the programmer 2.

In a step S4, the programmer 2 calculates a second verification code according to the burnt payload after the payload is burnt into the programmable device 8.

In a step S5, the programmer 2 verifies the first verification code and the second verification code. If the verification result is successful, the burning task is executed. In the steps S4 and S5, the programmer 2 reads the payload that has been burnt into programmable device 8 in order to calculate the second verification code. In addition, the second verification code and the first verification code temporarily stored in the random-access memory are verified by the programmer 2. Then, the verification result is transmitted from the programmer 2 to the programming unit 4. Then, the read payload and the second verification code are erased by the programmer 2.

Then, a step S6 is performed. While the burning task is performed, the programming unit 4 generates an OEM certificate signing request according to an identifiable information and a programmable device public key in the programmable device 8.

In an embodiment, the step S6 includes the following sub-steps.

Firstly, the programmer 2 reads the identifiable information and the programable device public key from programmable device 8 and transmits the identifiable information and the programable device public key to the programming unit 4. Then, the programming unit 4 generates the OEM certificate signing request according to the identifiable information and the programmable device public key.

After the step S6, a step S7 is performed. In the step S7, the authentication module 3 verifies the OEM certificate signing request according to a hash value. If the verification result is successful, an OEM device certificate is generated. It is noted that the step S7 may be modified. In another embodiment, the authentication module 3 verifies the OEM certificate signing request according to the hash value. If the verification result is successful, the OEM device certificate is generated and transmitted to the hardware security module 5. The hardware security module is configured to sign the OEM device certificate and generate a signed OEM device certificate.

In an embodiment, the step S7 includes the following sub-steps.

After the programming unit 4 generates the hash value according to the OEM certificate signing request, the hash value is transmitted to the programmable device 8 through the programmer 2. After the programmable device 8 receives the hash value, the hash value is signed through the use of a programmable device private key. Then, the signed hash value is transmitted to the programming unit 4 through the programmer 2. Then, the signed hash value and the OEM certificate signing request are transmitted to the authentication module 3. Then, the authentication module 3 verifies whether the signed hash value complies with the OEM certificate signing request. If the verification result is successful, the OEM device certificate is generated and transmitted to the hardware security module 5.

After the step S7, a step S8 is performed. In the step S8, the hardware security module 5 signs the OEM device certificate with the OEM private key. In an embodiment, the OEM private key is stored in the hardware security module 5. After the hardware security module 5 receives the OEM device certificate, the OEM device certificate is signed with the OEM private key stored therein. Then, the signed OEM device certificate is transmitted from the authentication module 3 to the programming unit 4.

In a step S9, the programming unit 4 verifies the OEM device certificate with the OEM public key. In an embodiment, after the programming unit 4 verifies the OEM device certificate with the OEM public key and the verification result is correct, the OEM device certificate is transmitted to the programmer 2.

If the verification result of the step S9 is correct, a step S10 is performed. In the step S10, the programmer 2 calculates a third verification code according to the OEM device certificate. In an embodiment, the programmer 2 calculates the third verification code according to the received OEM device certificate. Then, the third verification code is temporarily stored in the random-access memory of the programmer 2.

In a step S11, the programmer 2 burns the OEM device certificate into the programmable device 8.

In a step S12, the programmer 2 reads the burnt OEM device certificate and calculates a fourth verification code according to the burnt OEM device certificate. In an embodiment, the programmer 2 reads the burnt OEM device certificate from the programmable device 8 and calculates the fourth verification code according to the burnt OEM device certificate.

In a step S13, the third verification code and the fourth verification code are verified. In an embodiment, the third verification code and the fourth verification code temporarily stored in the random-access memory are verified by the programmer 2. In addition, after the third verification code and the fourth verification code are verified, the read fourth verification code and the read OEM device certificate are erased by the programmer 2.

In a step S14, the programmable device 8 is categorized according to the verification result of the step S13. If the verification result is successful, the programmable device 8 is categorized into a first output container representing a good output container.

In other embodiments, the step S1 further includes a sub-step of extracting the payload from the secure storage unit 80. In some embodiments, the step S1 further includes a sub-step of extracting the OEM device certificate from the secure storage unit 80 of the programmable device 8.

In some embodiments, the step S14 further includes a sub-step of using a device transfer unit (not shown) to move the programmable device 8 into the first output container. Preferably but not exclusively, the device transfer unit is a robotic arm of an automation equipment.

In another embodiment, the operating method further includes a step S15 (not shown) and a step S16 (not shown). The step S15 and the step S16 are performed before the step S1. In the step S15, the job control package is generated. The control packet includes a programmer identification list. The programmer identification list records at least one programmer 2 capable of performing the burning task. In the step S16, at least one programmer 2 recorded in the programmer identification list is used to program the payload in the job control package into the programmable device 8.

If the verification result is not successful, the programmable device 8 is categorized into a second output container, representing a bad output container. In an embodiment, the first output container and the second output container are separate carrying trays.

In another embodiment, the operating method further includes a step S17. In the step S17, the programmer 2 is configured to program the encrypted payload into the programmable device 8.

In an embodiment, the programming unit 4 is connected with the programmer 2. The programming unit 4 verifies the OEM device certificate with the OEM public key. If the verification result is successful, the OEM device certificate is transmitted to the programmer 2. The programmer 2 is configured to program both of the OEM device certificate and the payload into the programmable device 8.

In an embodiment, the data and/or the instructions for executing the operating method shown in FIGS. 1A and 1B can be stored in computer-readable recording media. In addition, the computer-readable recording media can store at least one software instruction sequence. The software instruction sequence includes the instructions for executing the operating method shown in FIGS. 1A and 1B. For example, the software instruction sequence can be executed by one or more processors (not shown). In an embodiment, the computer-readable recording media include non-volatile media (e.g., optical disks or magnetic disks) and/or volatile media (e.g., main memories). The common forms of computer-readable recording media include floppy disks, flexible disks, hard disks, solid state drives, magnetic tapes, or any other magnetic data storage media, CD-ROMs, or any other optical data storage media, any physical media with patterns of holes, RAM, PROM, and EPROM, FLASH-EPROM, NVRAM, any other memory chip or cartridge.

From the above descriptions, the present invention provides a secure programming system, an operating method of the secure programming system, and a computer readable recording medium using the operating method. While the burning task is performed, the burnt data are only permitted to be read by the device that possesses the corresponding paired public or private keys and passes the real-time identity verification. Consequently, the burnt data will not be tampered, damaged, leaked and plagiarized. By using the secure programming system, the operating method of the secure programming system and the computer readable recording medium of the present invention, only the authenticated devices are allowed to operate/control firmware programs in the securely programmed integrated circuits.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for operating a secure programming system, the secure programming system comprising a programmer, a programming unit, an authentication module and a hardware security module, the method comprising steps of:
   a step (S1) the programmer using a security control unit key to decrypt an encrypted job control package so as to extract a payload;
   a step (S2) the programmer calculating a first verification code according to the payload;
   a step (S3) the programmer burning the payload into a programmable device;
   a step (S4) reading the burnt payload from the programmable device, and calculating a second verification code according to the burnt payload;
   a step (S5) the programmer verifying the first verification code and the second verification code, wherein when the first verification code and the second verification code are verified successfully, a burning task is performed;
   a step (S6) while the burning task is performed, the programming unit generating an Original Equipment Manufacturer (OEM) certificate signing request according to an identifiable information and a programmable device public key in the programmable device;
   a step (S7) the authentication module verifying the OEM certificate signing request according to a hash value, wherein when the OEM certificate signing request is verified successfully, an OEM device certificate is generated;
   a step (S8) the hardware security module signing the OEM device certificate with an OEM private key;
   a step (S9) the programming unit verifying the OEM device certificate with an OEM public key;
   a step (S10) when a verification result of the step (S9) is correct, the programmer calculates a third verification code according to the OEM device certificate;
   a step (S11) the programmer burning the OEM device certificate into the programmable device;
   a step (S12) the programmer reading the burnt OEM device certificate from the programmable device and calculating a fourth verification code according to the burnt OEM device certificate;
   a step (S13) the programmer verifying the third verification code and the fourth verification code; and
   a step (S14) the programming unit categorizing the programmable device according to a verification result of the step (S13), wherein when the verification result is successful, the programmable device is categorized into a first output container representing a good output container.

2. The method according to claim 1, wherein in the step (S1), the payload is extracted from a secure storage unit of the programable device.

3. The method according to claim 1, wherein in the step (S12), the OEM device certificate is extracted from a secure storage unit of the programmable device.

4. The method according to claim 1, wherein in the step (S14), the programmable device is transferred into the first output container through a device transfer unit.

5. The method according to claim 1, wherein before the step (S1), the method further comprises steps of:
   a step (S15) generating the job control package, wherein the control packet includes a programmer identification list, and the programmer identification list records at least one programmer capable of performing the burning task; and
   a step (S16) using at least one programmer recorded in the programmer identification list to program the payload in the job control package into the programmable device.

6. The method according to claim 1, wherein in the step (S14), when the verification result is not successful, the programmable device is categorized into a second output container representing a bad output device.

7. The method according to claim 5, wherein the method further comprises a step (S17) of setting the programmer to program the encrypted payload into the programmable device.

8. A computer-readable recording medium for use in a secure programming system to store at least one software instruction sequence, the at least one software instruction sequence being executed by at least one processor, the secure programming system comprising a programmer, a programming unit, an authentication module and a hardware security module, the at least one software instruction sequence being executed to perform a method comprising steps of:
   a step (S1) the programmer using a security control unit key to decrypt an encrypted job control package so as to extract a payload;
   a step (S2) the programmer calculating a first verification code according to the payload;
   a step (S3) the programmer burning the payload into a programmable device;
   a step (S4) reading the burnt payload from the programmable device, and calculating a second verification code according to the burnt payload;
   a step (S5) the programmer verifying the first verification code and the second verification code, wherein when the first verification code and the second verification code are verified successfully, a burning task is performed;
   a step (S6) while the burning task is performed, the programming unit generating an Original Equipment Manufacturer (OEM) certificate signing request according to an identifiable information and a programmable device public key in the programmable device;
   a step (S7) the authentication module verifying the OEM certificate signing request according to a hash value, wherein when the OEM certificate signing request is verified successfully, an OEM device certificate is generated;

a step (S8) the hardware security module signing the OEM device certificate with an OEM private key;

a step (S9) the programming unit verifying the OEM device certificate with an OEM public key;

a step (S10) when a verification result of the step (S9) is correct, the programmer calculating a third verification code according to the OEM device certificate;

a step (S11) the programmer burning the OEM device certificate into the programmable device;

a step (S12) the programmer reading the burnt OEM device certificate from the programmable device and calculating a fourth verification code according to the burnt OEM device certificate;

a step (S13) the programmer verifying the third verification code and the fourth verification code; and a step (S14) the programming unit categorizing the programmable device according to a verification result of the step (S13) wherein when the verification result is successful, the programmable device is categorized into a first output container representing a good output container.

9. The computer-readable recording medium according to claim 8, wherein in the step (S1), the payload is extracted from a secure storage unit of the programable device.

10. The computer-readable recording medium according to claim 8, wherein in the step (S12), the OEM device certificate is extracted from a secure storage unit of the programmable device.

11. The computer-readable recording medium according to claim 8, wherein in the step (S14), the programmable device is transferred into the first output container through a device transfer unit.

12. The computer-readable recording medium according to claim 8, wherein before the step (S1), the method further comprises steps of:

a step (S15) generating the job control package, wherein the control packet includes a programmer identification list, and the programmer identification list records at least one programmer capable of performing the burning task; and a step (S16) using at least one programmer recorded in the programmer identification list to program the payload in the job control package into the programmable device.

13. The computer-readable recording medium according to claim 8, wherein in the step (S14), when the verification result is not successful, the programmable device is categorized into a second output container representing a bad output device.

14. The computer-readable recording medium according to claim 12, wherein the method further comprises a step (S17) of setting the programmer to program the encrypted payload into the programmable device.

15. A secure programming system, comprising:

a programmer using a security control unit key to decrypt an encrypted job control package to extract a payload, calculating a first verification code according to the payload, and burning the payload into a programmable device, wherein after the payload is burnt into the programmable device, the programmer reads the burnt payload from the programmable device, calculates a second verification code according to the burnt payload, and verifies the first verification code and the second verification code, wherein when the first verification code and the second verification code are verified successfully, a burning task is performed, wherein while the burning task is performed, the programmer reads an identifiable information and a programmable device public key from the programmable device and transmits the identifiable information and the programmable device public key to a programming unit, so that the programming unit generates an Original Equipment Manufacturer (OEM) certificate signing request;

an authentication module connected with the hardware security module, and verifying an OEM certificate signing request according to a hash value, wherein when the OEM certificate signing request is verified successfully, the authentication module generates an OEM device certificate to the hardware security module, wherein the hardware security module is configured to sign the OEM device certificate and generate a signed OEM device certificate; and a programming unit connected with the programmer, and verifying the OEM device certificate with an OEM public key, wherein when the OEM device certificate is verified successfully, the OEM device certificate is transmitted to the programmer, wherein the programmer programs both of the OEM device certificate and the payload into the programmable device, wherein when the OEM device certificate is successfully verified with the OEM public key by the programming unit, the programmer calculates a third verification code according to the OEM device certificate, and the programmer burns the OEM device certificate into the programmable device, wherein after the programmer reads the burnt OEM device certificate and calculates a fourth verification code according to the burnt OEM device certificate, the programmer verifies the third verification code and the fourth verification code, wherein the programming unit categorizes the programmable device according to a result of verifying the third verification code and the fourth verification code, wherein when the third verification code and the fourth verification code are verified successfully, the programmable device is categorized into a first output container representing a good output container.

16. The secure programming system according to claim 15, wherein the programmer extracts the payload from a secure storage unit of the programmable device.

17. The secure programming system according to claim 15, wherein when the OEM certificate signing request is verified successfully according to the hash value, the hardware security module signs the OEM device certificate with an OEM private key.

18. The secure programming system according to claim 15, wherein the programmer extracts the OEM device certificate from a secure storage unit of the programmable device.

19. The secure programming system according to claim 15, wherein the programmer transfers the programmable device into the first output container through a device transfer unit.

20. The secure programming system according to claim 15, wherein the security control unit generates the job control package including a programmer identification list, wherein the programmer identification list records at least one programmer capable of performing the burning task, and the at least one programmer recorded in the programmer identification list is used to program the payload in the job control package into the programmable device.

21. The secure programming system according to claim 15, wherein the encrypted payload is programmed into the programmable device by the programmer.

22. The secure programming system according to claim 20, wherein the programming unit is configured to verify the at least one programmer recorded in the programmer identification list and capable of performing the burning task and verify the identifiable information of the programmer of the secure programming system, wherein if the at least one programmer recorded in the programmer identification list and the identifiable information of the programmer of the secure programming system are verified successfully, the OEM device certificate is programmed into the programmable device by the programming unit.

23. The secure programming system according to claim 15, wherein the programming unit acquires a production count, wherein when a burn count in the programmer is less than the production count, the programming unit drives the programmer to perform the burning task, wherein when the burn count in the programmer exceeds the production count, the programming unit drives the programmer to perform the burning task, wherein the burn count in the programmer is smaller than or equal to an upper limit of the production count.

24. The secure programming system according to claim 15, wherein when the third verification code and the fourth verification code are not verified successfully, the programmable device is categorized into a second output container representing a bad output container.

\* \* \* \* \*